United States Patent
Deml et al.

(10) Patent No.: US 6,757,287 B1
(45) Date of Patent: *Jun. 29, 2004

(54) DEVICE AND METHOD FOR CONTROLLING A DATA TRANSMISSION OPERATION BETWEEN A FIRST ATM DEVICE AND A SECOND ATM DEVICE

(75) Inventors: Reinhard Deml, München (DE); Gunnar Boll, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/555,912
(22) PCT Filed: Nov. 24, 1998
(86) PCT No.: PCT/DE98/03462
§ 371 (c)(1), (2), (4) Date: Jun. 6, 2000
(87) PCT Pub. No.: WO99/31923
PCT Pub. Date: Jun. 24, 1999

(30) Foreign Application Priority Data
Dec. 12, 1997 (DE) ......................................... 197 55 374

(51) Int. Cl.$^7$ .............................................. H04L 12/56
(52) U.S. Cl. .................................... 370/395.7; 370/413
(58) Field of Search .......................... 370/395.1, 395.7, 370/395.71, 395.72, 412, 413, 415, 417, 428, 429

(56) References Cited

U.S. PATENT DOCUMENTS 5,222,108 A * 6/1993 Suzuki ........................ 375/372
5,548,587 A   8/1996 Bailey et al.
5,991,295 A * 11/1999 Tout et al. ................ 370/395.7

FOREIGN PATENT DOCUMENTS

EP   0 492 440   7/1992

OTHER PUBLICATIONS

"MOS Integrated Circuit μPD98410", NEC Corporation, 1997, Document No. S12624EJ1V0DS00 (1$^{st}$ Edition), 3 pages.

Data Sheet: MPC860SAR—"Functional Design Specification", Motorola, Jun. 1997, 3 pages.

* cited by examiner

*Primary Examiner*—Kwang Bin Yao
(74) *Attorney, Agent, or Firm*—Staas & Halsey LLP

(57) ABSTRACT

An ATM interface device (SS) that is connected via a first data bus (SAR_DAT) to a first ATM device (SAR) implementing an access coordination of the first data bus (SAR_DAT) and that is connected via a second data bus (ATM_RDAT, ATM_TDAT) to a second ATM device (MUX) implementing an access coordination of the second data bus (ATM_RDAT, ATM_TDAT) is provided for a data transmission. The ATM interface device (SS) comprises a control module (CC) and two FIFO memories (R_FIFO, T_FIFO) for intermediate storage of data to be communicated.

8 Claims, 5 Drawing Sheets

DEVICE AND METHOD FOR CONTROLLING A DATA TRANSMISSION OPERATION BETWEEN A FIRST ATM DEVICE AND A SECOND ATM DEVICE

BACKGROUND OF THE INVENTION

1. Field of the Invention

The invention relates to an ATM interface device and method of using the device for a data transmission between a first ATM device and a second ATM device.

2. Description of the Related Art

The significance of transmission and switching technologies for high data transmission rates (greater than 100 Mbit/s) is increasing due to the increasing need for a transmission of video information in modern communications technology such as, still and moving images in picture telephony applications or the display of high-resolution graphics at modern personal computers. The asynchronous transfer mode (ATM) is a known data transmission method for high data rates. A data transmission on the basis of the asynchronous transfer mode currently enables a variable transmission bit rate of up to 622 Mbit/s.

Known switching equipment, including those that operate on the basis of the asynchronous transfer mode, are usually modularly constructed. A backplane (a central plug assembly shared by all assemblies) connects a plurality of assemblies, including an interface for the connection of subscriber lines, and a central controller or a through-connection mechanism. The modularity of the switching equipment that is achieved in this configuration enables, among other things, an easy adaptation of a switching equipment to different configurations as well as a simplified error analysis when servicing the equipment.

The data sheet "MOS INTEGRATED CIRCUIT $\mu$PD98410", NEC Corporation, 1997, Document No. S12624EJ1V0DS00 ($1^{st}$ Edition) discloses an LSI through-connect module that allows an addressing of a plurality of interfaces via a 16-bit wide, high-frequency ATM-specific bus interface the (UTOPIA interface: Universal Test & Operations PHY Interface for ATM).

For using such a through-connect module designed for ATM applications in a through-connect module of an ATM switching equipment, it has already been proposed that the through-connect module be placed on the central plug assembly. A conversion of the 16-bit wide data bus onto a plurality of 8-bit wide unidirectional data busses is realized by ATM multiplex devices connected to the through-connect module via a 16-bit wide data bus, so that traditional, 8-bit wide modules can be employed on the assemblies.

The Data Sheet "MPC860SAR—Functional Design Specification", Motorola, 6/97 discloses a control module MPC860SAR that comprises an 8-bit wide, bidirectional ATM-specific bus interface (UTOPIA interface), that could be used for example, for a connection of a central control assembly to an ATM switching equipment.

Both the ATM multiplexer as well as the control module MPC860SAR realize an access coordination for data busses connectable to them, i.e., the ATM multiplexer and the control module MPC860SAR are "master" modules for the 8-bit wide data busses connectable to them.

European Patent EP 0 492 440 discloses an ATM interface device via which a data communication between two ATM devices is realized upon intermediate storage of the communicated data in a FIFO memory (First In First Out). An inscription or, respectively, readout of data from the FIFO memory ensues with an activation of the FIFO memory by a read or, respectively, write signal sent from an ATM device.

SUMMARY OF THE INVENTION

The present invention is based on the object of specifying a method and an arrangement with which a data transmission can be realized between a first and a second ATM device respectively configured as "master".

This object is achieved by a method for a data transmission between a first ATM device and a second ATM device via an ATM interface device, wherein the first ATM device comprises a data-transmitting ATM transmission module and the second ATM device comprises a data-receiving ATM reception module, comprising the steps of:

communicating, by a control module of the ATM interface device, a first receiver status information for signalling free memory capacity of a memory of the ATM interface device to the ATM transmission module;

activating a first memory control input of the memory by the ATM transmission module and outputting the data to be communicated by the ATM transmission module onto a first data bus connecting the ATM transmission module to the memory;

intermediately storing data received via the first data bus by the memory as long as the first memory control input is activated;

communicating, by the control module, to the ATM reception module, a sender status information for signalling a presence of data to be communicated from the memory to the ATM reception module;

activating, by the control module, a second memory control input of the memory when the ATM reception module is ready to receive and when data to be communicated to the ATM reception module are intermediately stored in the memory;

outputting, by the memory the intermediately stored data onto a second data bus that connects the memory to the ATM reception module, as long as the second memory control input is activated.

The object is also achieved by an ATM interface device, comprising:

at least one first data bus for connection to a first ATM access control device that implements an access coordination of the first data bus;

at least one second data bus for connection to a second ATM access control device implementing an access coordination of the second data bus;

a first memory for an intermediate storage of data to be communicated from the first access control device to the second access control device, the first memory comprising:

a first memory control input that is driven by the first ATM access control device such that, given activation of the first memory control input, a storing of data communicated from the first ATM access control device ensues, and a second memory control input that is driven by the second ATM access control device such that, given activation of the second memory control input, a communication of data stored in the first memory ensues to the second ATM access control device, the ATM interface device further comprising:

a second memory for an intermediate storage of data to be communicated from the second ATM access control device to the] first ATM access control device, the second memory comprising:

a first memory control input that is driven by the second ATM access control device] such that, given activation of the first memory control input, an inscription of data communicated from the second ATM access control device ensues, and a second memory control input that is driven by the first ATM access control device such that, given activation of the second memory control input, a communication of data stored in the second memory ensues to the first ATM access control device, the ATM interface device further comprising:

a control module for determining free memory capacities of the first memory and of the second memory and for communicating:

a receiver status information for a signalling of free memory capacity of the first memory to the first ATM access control device, a second receiver status information for signalling free memory capacity of the second memory to the second ATM access control device a first sender status information to the first ATM access control device for a signalling of a presence of data to be communicated from the second memory to the first ATM access control device, and a second sender status information to the [the] second ATM access control device for signalling a presence of data to be communicated from the first memory to the second ATM access control device.

A critical advantage of the invention is that both the first as well as the second ATM device continue to be configured as "master" device for the data bus connected to them, so that only minor modification of "hardware structure" of the respective ATM device are required.

A further advantage of the invention is that, due to an interposition of an ATM interface device that is connected via a first data bus to a first ATM device and via a second data bus to a second ATM device, conflicts that might occur for a simultaneous access of the first and of the second ATM device to a data bus connecting them are avoided.

A time decoupling of the first and second data bus is realized by an intermediate storage of communicated data in the ATM interface device so that the two data busses can be operated with a separate clock rate different from one another.

Advantageous developments of the invention are described below.

BRIEF DESCRIPTION OF THE DRAWINGS

An exemplary embodiment of the invention is explained in greater detail below on the basis of the drawings.

DESCRIPTION OF THE PREFERRED EMBODIMENT

Figure 1:
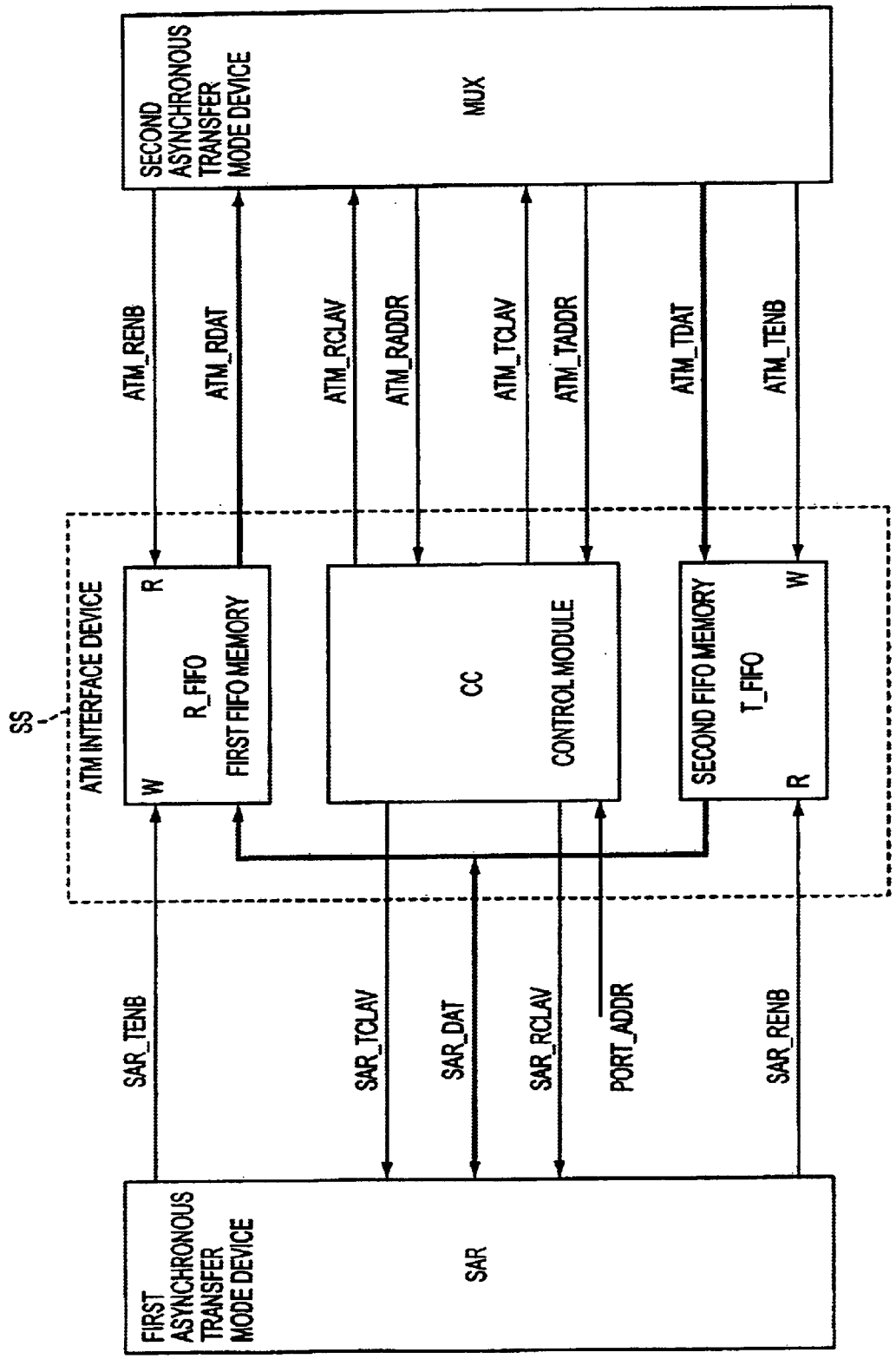
FIG. 1 is a structurgram related to the schematic illustration of the critical function units participating in the framework of a data transfer between a first ATM device and a second ATM device.

FIG. 1 shows a schematic illustration of the critical function units that participate in the framework of a data transfer between a first ATM device SAR and a second ATM device MUX. The first ATM device SAR is connected to an ATM interface device SS via a first bidirectional data bus SAR_DAT operated with a first clock rate. The second ATM device MUX is connected to the ATM interface device SS via a second and a third unidirectional data bus ATM_RDAT; ATM_TDAT operated with a second clock rate that differs from the first clock rate.

The ATM interface device SS comprises a control module CC, a first FIFO memory R_FIFO and a second FIFO memory T_FIFO. The first FIFO (first-in-first-out) memory R_FIFO serves for an intermediate storing of data to be communicated from the first ATM device SAR to the second ATM device MUX. The second FIFO memory T_FIFO serves for an intermediate storing of data to be communicated from the second ATM device MUX to the first ATM device SAR. The control module CC determines the memory filling levels of the first FIFO memory R_FIFO and of the second FIFO memory T_FIFO.

When an adjustable memory filling value of the first FIFO memory R_FIFO has not been exceeded, the control module CC signals a free memory capacity of the first FIFO memory R_FIFO to the first ATM device SAR with a first receiver status information SAR_TCLAV. Analogously, the control module CC signals free memory capacity of the second FIFO memory T_FIFO to the second ATM device MUX with a second receiver status information ATM_TCLAV when an adjustable memory filling value of the second FIFO memory T_FIFO has not been exceeded.

When data to be communicated to the second ATM device MUX are intermediately stored in the first FIFO memory R_FIFO, the control module CC signals this to the second ATM device MUX with a second sender status information ATM_RCLAV. Analogously, the control module CC uses a first sender status information SAR_RCLAV to the first ATM device SAR to indicate that data to be communicated to the first ATM device SAR are intermediately stored in the second FIFO memory T_FIFO.

The first FIFO memory R_FIFO and the second FIFO memory T_FIFO respectively comprise a first memory control input W at the input side and a second memory control input R at the output side. When the first memory control input W of a FIFO memory R_FIFO, T_FIFO is activated by a write signal SAR_TENB, ATM_RENB, the FIFO memory R_FIFO, T_FIFO reads data received via a data bus SAR_DAT, ATM_RDAT connected to the FIFO memory R_FIFO, T_FIFO at the input side and stores these data. When the second memory control input R of a FIFO memory R_FIFO, T_FIFO is activated by a read signal ATM_TENB, SAR_RENB, the FIFO memory R_FIFO, T_FIFO reads the intermediately stored data out and outputs these data onto a data bus ATM_TDAT, SAR_DAT connected to the FIFO memory R_FIFO, T_FIFO at the output side.

A plurality of first ATM devices SAR are connectable to a second ATM device MUX via ATM interface devices SS. For an addressing of the first ATM devices SAR, each ATM interface device SS has an individual post address PORT_ADDR allocated to it. With a receiver address status information ATM_TADDR and a sender address status information ATM_RADDR, the second ATM device MUX signals the ATM interface device SS with respect to which of the addressable, first ATM devices SAR the second ATM device MUX has data to be communicated or, respectively, from which of the addressable, first ATM devices SAR the second ATM devices MUX can receive data.

A description of the basic structure of and ATM message will aid the understanding of the remaining figures. Data packets of fixed length ("cells"), are employed for the data transport in the transmission method known as asynchronous transfer mode (ATM). An ATM cell is composed of a cell header ("header") that is five bytes long and contains the switching data relevant for the transport of an ATM cell and of a payload data field, ("payload") that is 48 bytes long.

Figure 2:
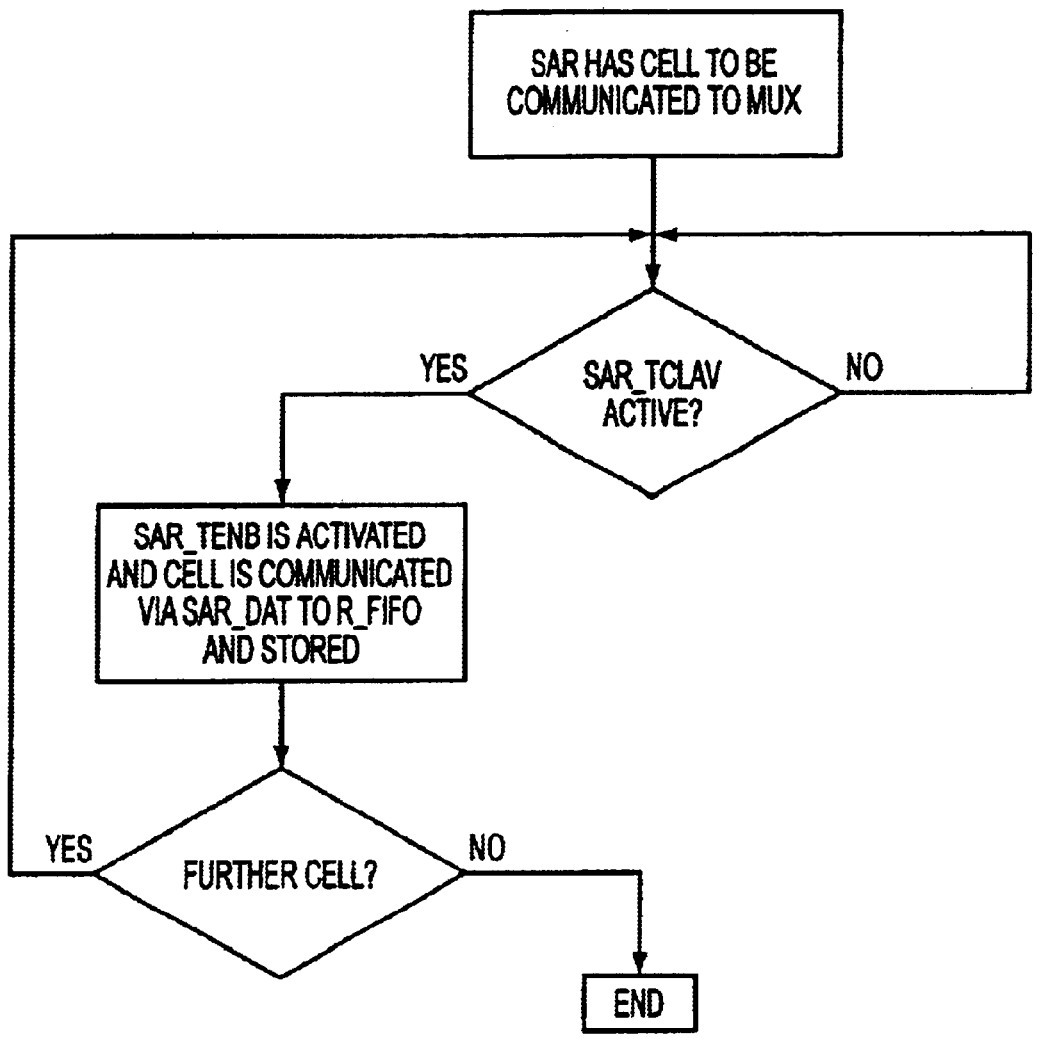
FIG. 2 is a flowchart for a data transfer from a first ATM device to a first memory of the ATM interface device.

FIG. 2 shows a flowchart for a data transfer from the first ATM device SAR to the first FIFO memory R_FIFO. When the first ATM device SAR has an ATM cell to be communicated to the second ATM device MUX, the first ATM device SAR checks whether the first receiver status information SAR_TCLAV is active, i.e., the first FIFO memory R_FIFO has free memory capacity. When this is the case, the first ATM device SAR activates the first memory control input W of the first FIFO memory R_FIFO with the write signal SAR_TENB and outputs the ATM cell to be transmitted byte-by-byte onto the first data bus SAR_DAT connecting the first ATM device SAR to the first FIFO memory R_FIFO and the second FIFO memory T_FIFO. As long as the first memory control input W of the first FIFO memory R_FIFO is activated, the first FIFO memory R_FIFO reads data received via the first data bus SAR_DAT and stores these data.

When the first ATM device SAR has a further ATM cell to be communicated to the second ATM device MUX, the first ATM device SAR checks whether the first receiver status information SAR_TCLAV continues to be active and continues the process as warranted.

Figure 3:
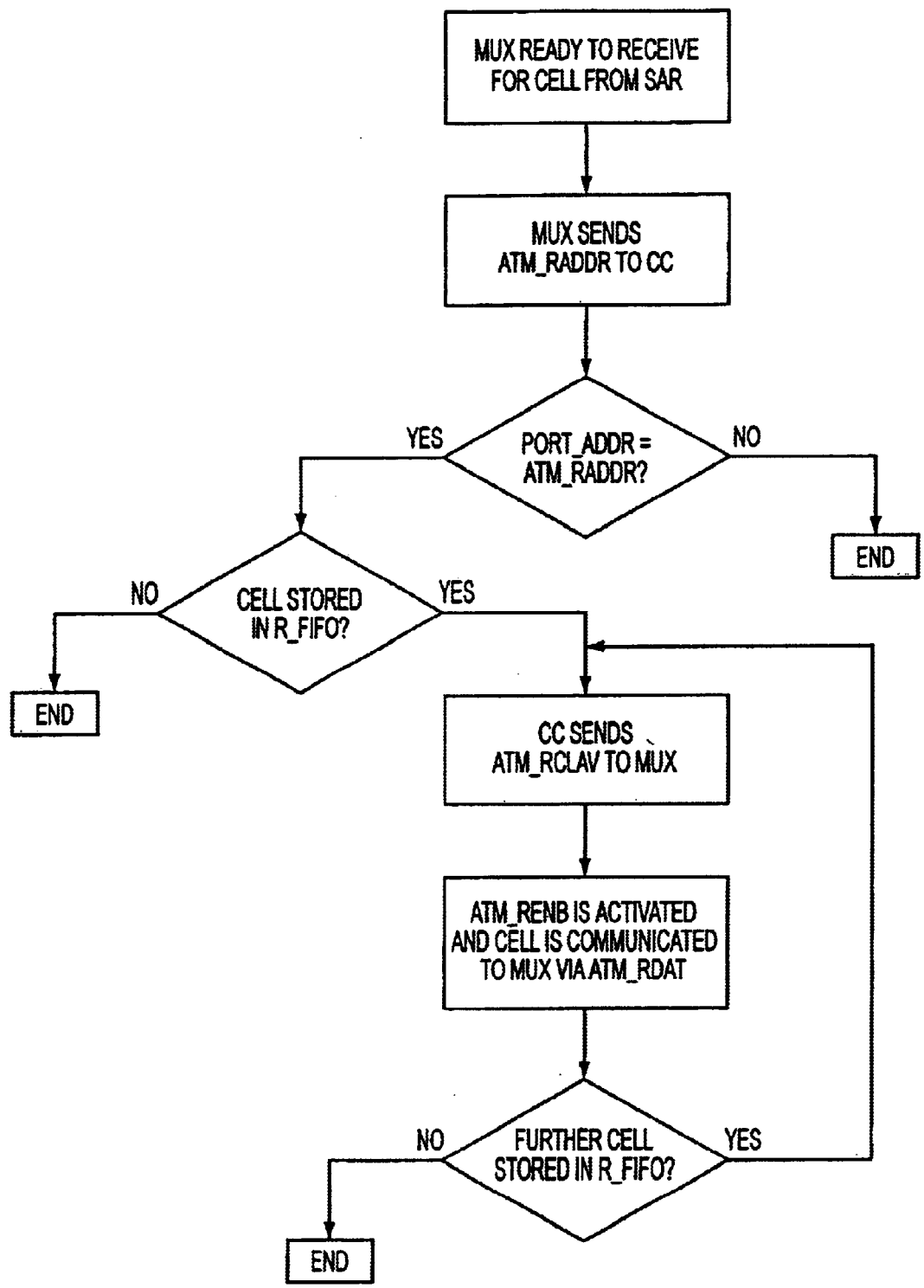
FIG. 3 is a flowchart for a data transfer from a first memory of the ATM interface device to a second ATM device.

FIG. 3 shows a flowchart for a data transfer from the first FIFO memory R_FIFO to the second ATM device MUX. When the second ATM device MUX can receive data from a connected, first ATM device SAR, the second ATM device MUX sends a sender address status information ATM_RADDR identifying this first ATM device SAR to the control module CC. When the sender address status information ATM_RADDR agrees with the port address PORT_ADDR of the interface device SS, the control device CC checks whether an ATM cell to be communicated to the second ATM device MUX is stored in the first FIFO memory R_FIFO. When this is the case, the control module CC sends a second sender status information ATM_RCLAV to the second ATM device MUX. In a next step, the second ATM device MUX activates the second memory control input R of the first FIFO memory R_FIFO with a read signal ATM_TENB. As long as the second memory control input R of the first FIFO memory R_FIFO is activated, the first FIFO memory R_FIFO outputs data byte-by-byte onto the second data bus ATM_TDAT connecting the first FIFO memory R_FIFO to the second ATM device MUX, which the data is read by the second ATM device MUX.

When the ATM cell has been communicated to the second ATM device MUX, the control module CC checks whether a further ATM cell is stored in the first FIFO memory R_FIFO. When this is the case, the control module CC again sends a second sender status information ATM_RCLAV to the second ATM device MUX.

Figure 4:
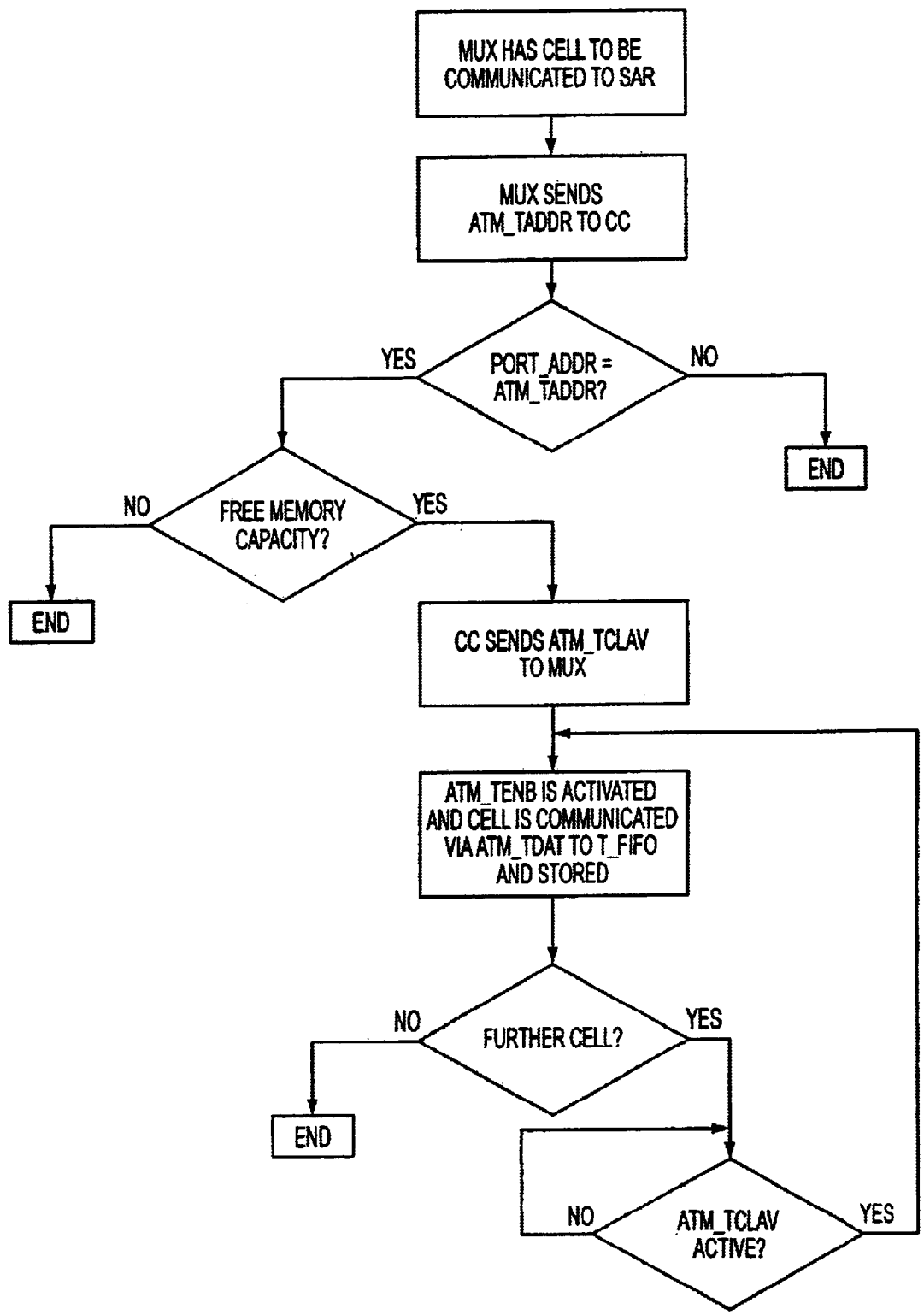
FIG. 4 is a flowchart for a data transfer from a second ATM device to a second memory of the ATM interface device.

FIG. 4 shows a flowchart for a data transfer from the second ATM device MUX to the second FIFO memory T_FIFO. When the second ATM device MUX has an ATM cell to be communicated to a connected, first ATM device SAR, the second ATM device MUX sends a receiver address status ATM_SDDR identifying this first ATM device SAR to the control module CC. When the receiver address status information ATM_TADDR agrees with the port address PORT_ADDR of the interface device SS, the control module CC checks whether the adjustable memory filling value is exceeded in the second FIFO memory T_FIFO, i.e., whether the second FIFO memory T_FIFO has free memory capacity. When the second FIFO memory T_FIFO has free memory capacity, the control module CC sends a second receiver status information ATM_TCLAV to the second ATM device MUX. Subsequently, the control module CC activates the first memory control input W of the second FIFO memory T_FIFO with the write signal ATM_TENB and outputs the ATM cell to be communicated byte-by-byte onto the third data bus ATM_TDAT connecting the second ATM device MUX to the second FIFO memory T_FIFO. As long as the first memory control input W of the second FIFO memory T_FIFO is activated, the second FIFO memory T_FIFO reads data received via the third data bus ATM_TDAT and stores these data.

When the second ATM device MUX has a further ATM cell to be communicated to the first ATM device SAR, the second ATM device MUX checks whether the second receiver status information ATM_TCLAV continues to be active and continues the process as warranted.

Figure 5:
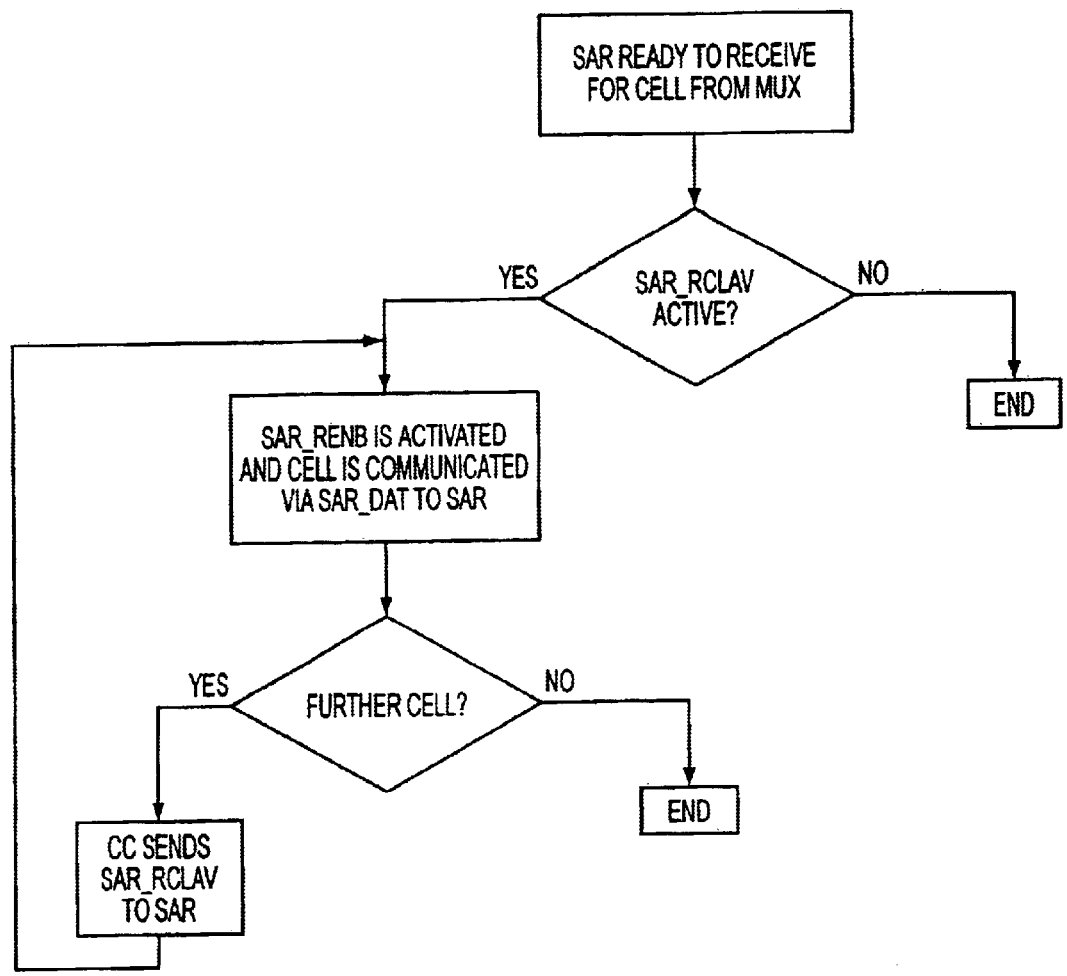
FIG. 5 is a flowchart for a data transfer from a second memory of the ATM interface device to a first ATM device.

FIG. 5 shows a flowchart for a data transfer from the second FIFO memory T_FIFO to the first ATM device SAR. When the first ATM device SAR can receive an ATM cell from the second ATM device MUX, the first ATM device SAR checks whether the first sender status information SAR_RCLAV is active, i.e., whether at least one ATM cell to be communicated to the first ATM device SAR is intermediately stored in the second FIFO memory T_FIFO. When this is the case, the first ATM device SAR activates the second memory control input R of the second FIFO memory T_FIFO with the read signal SAR_RENB. As long as the second memory control input R of the second FIFO memory T_FIFO is activated, the second FIFO memory T_FIFO outputs data byte-by-byte onto the first data bus SAR_DAT, from which they are read by the first ATM device SAR.

When the ATM cell has been communicated to the first ATM device SAR, the control module CC checks whether a further ATM cell is stored in the second FIFO memory T_FIFO. When this is the case, the control module CC again sends a first sender status information SAR_RCLAV to the first ATM device SAR.

The above-described invention is illustrative of the principles of the present invention. Numerous modifications and adaptions thereof will be readily apparent to those skilled in this art without departing from the spirit and scope of the present invention.

What is claimed is:

1. A method for a data transmission between a first ATM device and a second ATM device via an ATM interface device, wherein said first ATM device comprises a data-transmitting ATM transmission module and said second ATM device comprises a data-receiving ATM reception module, comprising the steps of:

communicating, by a control module of said ATM interface device, a first receiver status information for signaling free memory capacity of a memory of said ATM interface device to said ATM transmission module;

activating a first memory control input of said memory by said ATM transmission module and outputting said data to be communicated by said ATM transmission module onto a first data bus connecting said ATM transmission module to said memory;

intermediately storing data received via said first data bus by said memory as long as said first memory control input is activated;

communicating by said control module, to said ATM reception module, a sender status information for signaling a presence of data to be communicated from said memory to said ATM reception module;

activating by said control module, a second memory control input of said memory when said ATM reception module is ready to receive and when data to be communicated to said ATM reception module are intermediately stored in said memory, a second memory control input of the memory is activated by the control module;

outputting by said memory said intermediately stored data onto a second data bus that connects said memory to said ATM reception module, as long as said second memory control input is activated.

2. A method according to claim 1, wherein:

said first ATM device comprises a data-receiving ATM reception module; and said second ATM device comprises a data-transmitting ATM transmission module.

3. A method according to claim 1, wherein said second ATM device is constructed such that a plurality of addressable first ATM devices can be addressed by said second ATM device.

4. A method according to claim 3, further comprising the steps of:

communicating, by said second ATM device, a sender address status information to said control module that indicates from which of said addressable first ATM devices said second ATM device can receive data; and communicating said sender status information to said second ATM device when said first ATM device can be addressed by said communicated sender address status information.

5. A method according to claim 3, further comprising the steps of:

communicating, by said second ATM device, a receiver address status information to said control module that indicates which of said addressable first ATM devices for which said second ATM device has data to be transmitted to; and communicating said receiver status information to said second ATM device when said first ATM device can be addressed by said communicated receiver address status information.

6. An ATM interface device, comprising:

at least one first data bus for connection to a first ATM access control device that implements an access coordination of said first data bus;

at least one second data bus for connection to a second ATM access control device implementing an access coordination of said second data bus;

a first memory for an intermediate storage of data to be communicated from said first access control device to said second access control device, said first memory comprising:

a first memory control input that is driven by said first ATM access control device such that, given activation of said first memory control input, a storing of data communicated from said first ATM access control device ensues, and a second memory control input that is driven by said second ATM access control device such that, given activation of said second memory control input, a communication of data stored in said first memory ensues to said second ATM access control device, said ATM interface device further comprising:

a second memory for an intermediate storage of data to be communicated from said second ATM access control device to said first ATM access control device, said second memory comprising:

a first memory control input that is driven by said second ATM access control device such that, given activation of said first memory control input, an inscription of data communicated from said second ATM access control device ensues, and a second memory control input that is driven by said first ATM access control device such that, given activation of said second memory control input, a communication of data stored in said second memory ensues to said first ATM access control device, said ATM interface device further comprising:

a control module for determining free memory capacities of said first memory and of said second memory and for communicating:

a receiver status information for a signaling of free memory capacity of said first memory to said first ATM access control device, a second receiver status information for signaling free memory capacity of said second memory to said second ATM access control device, a first sender status information to said first ATM access control device for a signaling of a presence of data to be communicated from said second memory to said first ATM access control device, and a second sender status information to said second ATM access control device for signaling a presence of data to be communicated from said first memory to said second ATM access control device.

7. An ATM interface device according to claim 6, wherein said first memory and said second memory are first-in-first-out memories.

8. An ATM interface device according to claim 6 wherein a plurality of first access control devices are connectable to said second access control device.

* * * * *